United States Patent [19]

Klope

[11] 4,190,298
[45] Feb. 26, 1980

[54] FLUID CONTROL SYSTEM

[75] Inventor: Lawrence R. Klope, Cedar Falls, Iowa

[73] Assignee: Deere & Company, Moline, Ill.

[21] Appl. No.: 952,173

[22] Filed: Oct. 17, 1978

[51] Int. Cl.² ............................................. B60T 13/14
[52] U.S. Cl. ........................................... 303/2; 303/13
[58] Field of Search ...................... 303/2, 6 R, 6 A, 9, 303/10, 13, 14, 7

[56] References Cited
U.S. PATENT DOCUMENTS

| | | | |
|---|---|---|---|
| 1,156,871 | 10/1915 | Aikman | 303/14 |
| 3,443,839 | 5/1969 | Hinrichs et al. | 303/13 X |
| 3,672,729 | 6/1972 | Blakey | 303/9 |
| 3,957,315 | 5/1976 | Cummins et al. | 303/13 X |
| 3,992,064 | 11/1976 | Carton et al. | 303/7 |

*Primary Examiner*—Duane A. Reger

[57] ABSTRACT

A fluid control system providing a backup system for activating a pair of brakes on a vehicle includes a pair of double check valves with cross bleed located near the brakes. Each double check valve is connected at one end to a brake control valve which is in turn connected to a main pump and reservoir. The second ends of the double check valves are commonly connected to a secondary brake control valve which is connected to an accumulator which is fluid pressurized from the main pump. The center connections between the two ends of each of the double check valves are connected to one of the pair of brakes. The double check valves respond to pressure differentials to connect the main pump or the accumulator, whichever is supplying the greater pressure, to the brakes.

14 Claims, 1 Drawing Figure

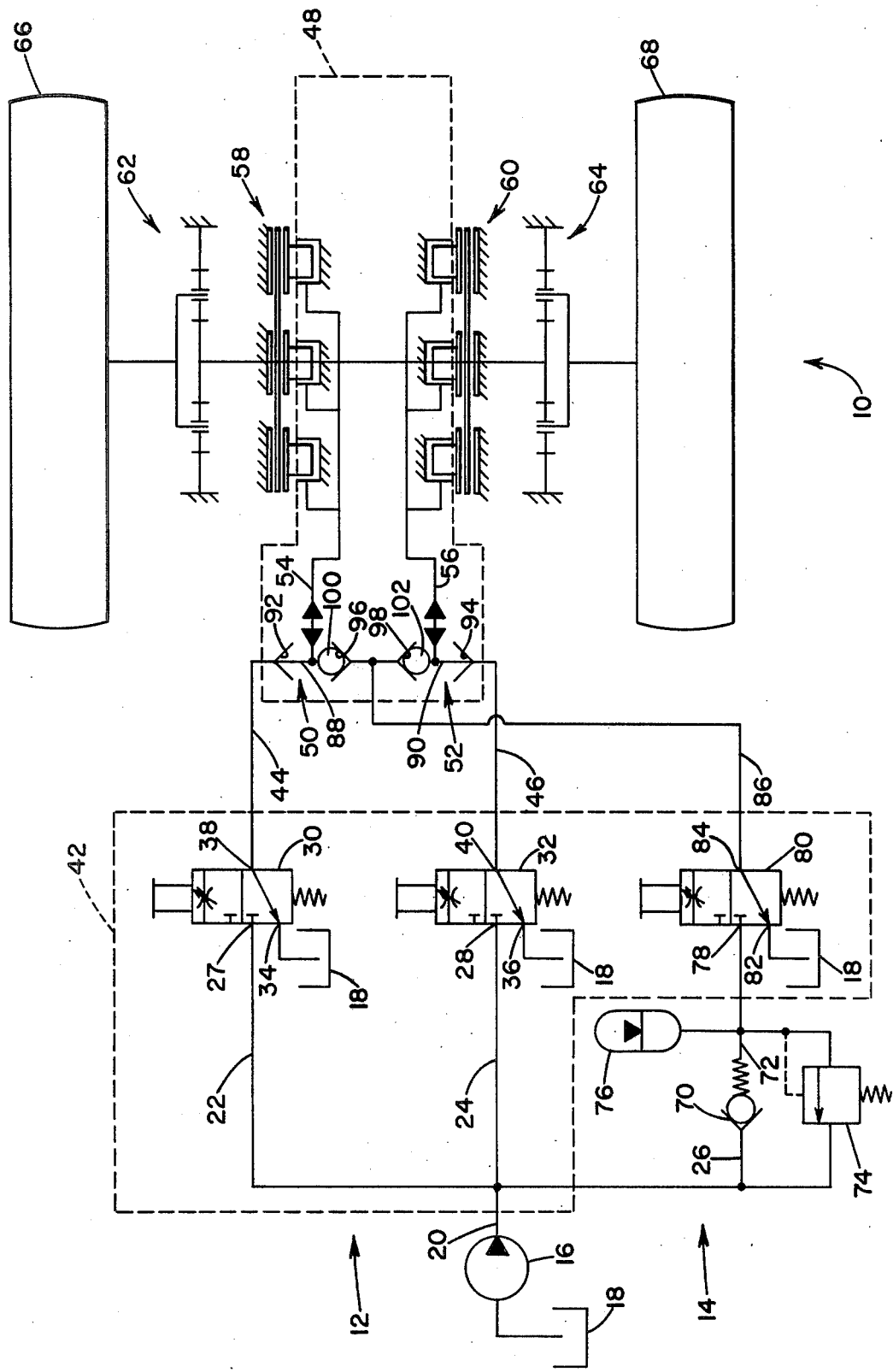

FLUID CONTROL SYSTEM

BACKGROUND OF THE INVENTION

The present invention relates generally to secondary or emergency brake systems and more particularly to a simplified secondary braking control system.

In the past, agricultural vehicles generally relied on mechanical secondary brakes which required separate braking surfaces from the primary braking system. Due to the energy loss associated with the separate braking systems and the desire to increase the efficiency of the overall braking system, a secondary actuation system for the primary braking surfaces has long been desired. However, most of the systems developed have made use of an entirely separate control system requiring a multiplicity of control lines and hydraulic accumulators.

SUMMARY OF THE INVENTION

The present invention provides a secondary braking system which requires only a single fluid line from the accumulator and secondary brake control valve to the transmission case in which the brakes are located. A double check valve allows each brake to be operated either from the primary or secondary brake control valve even if the brake line from the other is broken.

The present invention further provides a secondary control system which may easily be interposed in the design of existing primary brake control systems.

The above and additional advantages of the present invention will become apparent to those skilled in the art from a reading of the following detailed description when taken in conjunction with the accompanying drawing.

DESCRIPTION OF THE DRAWING

The drawing is a schematic illustration of the fluid control system of the present invention.

DESCRIPTION OF THE PREFERRED EMBODIMENT

Referring now to the drawing, therein is shown a fluid control system for an agricultural vehicle designated by the numeral 10. The fluid control system contains a primary braking system generally designated by the numeral 12 and a secondary braking system generally designated by the numeral 14.

The primary braking system 12 includes a main hydraulic supply pump 16 drawing hydraulic fluid from a hydraulic reservoir 18 and supplying it to a main supply line 20. The main supply line 20 then provides pressurized fluid to left and right supply lines 22 and 24 and to a secondary supply line 26.

It should be noted that the terminology "left" and "right" is used strictly for purposes of convenience for distinguishing between the various primary braking system elements and are not intended as limitations.

The left and right supply lines 22 and 24 are respectively connected to inlet ports 27 and 28 on respective left and right brake control valves 30 and 32. The left and right brake control valves 30 and 32 are conventional manually operable, three-way, two-position, internally modulated, fluid control valves which have respectively provided therein reservoir ports 34 and 36 and respective left and right brake ports 38 and 40. The left and right brake control valves 30 and 32 have a normal position in which the left and right brake ports 38 and 40 are respectively connected to the reservoir ports 34 and 36. The valves are individually actuatable, generally by means of a foot pedal in the vehicle control cab 42, to provide internally modulated connection of the inlet port 27 to the left brake port 38 or the inlet port 28 to the right brake port 40.

The left and right brake ports 38 and 40 are respectively connected to left and right brake lines 44 and 46 which pass out of the control cab 42 and along the vehicle 10 to a transmission case 48.

Inside the transmission case, the left and right brake lines 44 and 46 are respectively connected to the left and right double check valves 50 and 52 which will be described in greater detail later. The left and right double check valves 50 and 52 are respectively connected to left and right brake passages 54 and 56 which are connected to the usual brake pistons of conventional left and right brakes 58 and 60. The left and right brakes 58 and 60 serve to respectively brake the input shaft to left and right planetary gears 62 and 64 which drive the left and right ground-engaging wheels 66 and 68 of the vehicle 10.

Returning now to the secondary braking system 14 which contains the secondary supply line 26, the secondary supply line 26 is connected to a check valve 70. The check valve 70 normally allows the flow of fluid therethrough to an accumulator line 72 and blocks reverse flow. A conventional two-way, two-position relief valve 74 is connected in parallel to the check valve 70. The relief valve 74 is normally closed and pilot-operated at a predetermined pressure to allow the flow of fluid from the accumulator line 72 to the secondary supply line 26.

A conventional gas charged accumulator 76 is connected to the accumulator line 72 and is fluidly pressurized from the main pump 16 through the check valve 70.

The accumulator line 72 is further connected to an inlet port 78 of a secondary brake control valve 80. The secondary brake valve 80 is a conventional manually operable, three-way, two-position, internally modulated, fluid control valve having a reservoir port 82 and a secondary brake port 84. The secondary brake valve 80 has a normal position connecting the secondary brake port 84 with the reservoir port 82 and is actuatable, generally by a hand lever, to provide internally modulated fluid communication between the inlet port 78 and the secondary brake port 84.

The secondary brake port 84 is connected to a secondary brake line 86 which passes out of the control cab 42 and along the vehicle 10 to the transmission case 48 where it is commonly connected to the left and right double check valves 50 and 52.

The left and right double check valves 50 and 52 are conventional double check valves with cross bleeds which permit reverse flow operation. The valves are integral with the transmission case 48 which is provided with left and right valve bores 88 and 90. First ends 92 and 94 of the left and right double check valves 50 and 52 are connected respectively to the left and right brake lines 44 and 46. Second ends 96 and 98 respectively opposite the first ends 92 and 94 are connected together and further connected to the secondary brake line 86. Midway between the ends, the left and right double check valves 50 and 52 are respectively connected to the left and right brake passages 54 and 56.

Check balls 100 and 102 are respectively disposed within the left and right valve bores 88 and 90 to shuttle between ball seats disposed proximate the ends 92 and 96 and ball seats disposed proximate the ends 94 and 98, respectively.

In normal operation, when the brakes are not applied, the main pump 16 provides pressurized hydraulic fluid to the left and right supply lines 22 and 24 and to the secondary supply line 26. Initially, fluid from the secondary supply line 26 passes the check valve 70 to the accumulator line 72 to fluidly pressurize the accumulator 76.

Upon activation of one or both of the left and right brake control valves 30 and 32 of the primary braking system 12, modulated hydraulic fluid is supplied through one or both of the left and right brake lines 44 and 46 to one or both of the left and right double check valves 50 and 52. Since there will be no pressure in the secondary brake line 86 because the secondary brake valve 80 would not be activated, the balls 100 and 102 will be forced by the pressure of incoming fluid against the second ends 96 and 98, respectively. This prevents fluid loss through the secondary brake line 86 and the secondary brake control valve 80 to the reservoir 18. Thus, the left and right brake lines 44 and 46 will be connected to the left and right brake passages 54 and 56 to cause actuation of one or both of the left and right brakes 58 and 60.

When the brake control valves 30 and 32 are released, fluid will return from the left and right brakes 58 and 60, the respective left and right double check valves 50 and 52, and the left and right brake control valves 30 and 32 to the reservoirs 18.

The above is normal operation of the primary braking system 12 and generally the secondary braking system 14 will only be called for if there is a break or a leak in either the left or right brake lines 44 or 46 or in both lines or if the main pump 16 does not provide pressurized fluid.

For example, if there is a break or leak in the left brake line 44, the left brake 58 will not be activated. At this point, the secondary brake control valve 80 will be activated causing the main pump 16 to provide pressurized fluid, modulated by the valve 80, to the secondary brake line 86. Since the pressure in the secondary brake line 86 will be greater than that in the left brake line 44, the ball 100 will be shifted to the first end 92 to prevent the loss of fluid from the secondary brake line 86 into the broken left brake line 44. With the ball 100 abutting the first end 92, fluid from the pump 16 will be modulated through the secondary brake valve 80 and will pass through the secondary brake line 86 into the left brake passage 54 to actuate the left brake 58.

Modulation is provided in the secondary brake control valve 80 for the same reason it is present in the primary brake control valves. Since sudden application of the brakes will cause skidding, modulation is required to cause gradual, controlled application of the brakes.

Similarly, the pressurized fluid in the secondary brake line 86 will cause both balls 100 and 102 to seal off the left and right brake lines 44 and 46 and allow the passage of fluid to the left and right brake passages 54 and 56 to actuate the left and right brakes 58 and 60 for full braking of the vehicle 10.

If the main pump 16 is inoperative, the effect on the brakes will be the same as a break in both brake lines. Under this condition, the accumulator 76 will provide the pressurized fluid in the secondary brake line 86. The accumulator 76 is fluidly pressurized by the main pump 16 and contains a sufficient gas charge for a large number of brake applications.

As would be evident, the check valve 70 will prevent the flow of fluid from the accumulator 76 into the secondary supply line 26 when the main pump 16 is not pumping or if the left and right brake lines 44 and 46 are broken while left and right brake control valves 30 and 32 are applied. The relief valve 74 is provided as a protective feature so that when the accumulator 76 is charged when cold and then heated later by the vehicle engine which is in close proximity to it, the accumulator 76 will not be damaged by the increase in pressure.

While the invention has been described in conjunction with a specific embodiment, it is to be understood that many alternatives modifications, and variations will be apparent to those skilled in the art in light of the aforegoing description. Accordingly, it is intended to embrace all such alternatives, modifications, and variations which fall within the spirit and scope of the appended claims.

I claim:

1. A fluid control system comprising: fluid function means; a primary source of pressurized fluid for said fluid function means; a fluid reservoir; a primary fluid control valve connected to said primary source and said fluid reservoir and operatively connected to said fluid function means selectively connecting said primary source to said fluid function means or said fluid function means to said fluid reservoir; a secondary source of pressurized fluid for said fluid function means; a secondary fluid control valve connected to said secondary source and to said fluid reservoir and operatively connected to said fluid function means selectively connecting said secondary source to said fluid function means or said fluid function means to said fluid reservoir; and valve means connected to and disposed between said primary and secondary fluid control valves and said fluid function means responsive to a greater pressure of said pressurized fluid from said primary fluid control valve than from said secondary fluid control valve to block said fluid function means from said secondary fluid control valve and to connect said primary fluid control valve to said fluid function means, and responsive to a greater pressure of said pressurized fluid from said secondary fluid control valve than from said primary fluid control valve to block said fluid function means from said primary fluid control valve and to connect said secondary fluid control valve to said fluid function means.

2. The fluid control system as claimed in claim 1 wherein said valve means includes a valve body having a bore provided therein connected at a first end to said primary fluid control valve and at a second end to said secondary fluid control valve and at a midpoint between said first and second ends to said fluid function means, and said valve means includes a movable member slidably disposed in said bore responsive to said greater pressure of said pressurizing fluid from said primary or secondary fluid control valve to block the end with the greater pressure from the other end and connect said greater pressure pressurized fluid to said midpoint.

3. The fluid control system as claimed in claim 1 wherein said secondary source is connected to said primary source and includes storage means for storing said pressurized fluid from said primary source and providing said pressurized fluid to said secondary fluid control valve when said primary source is not providing said pressurized fluid to said secondary source and said primary fluid control valve.

4. The fluid control system as claimed in claim 3 including check means disposed between said primary and secondary sources providing unidirectional flow of said pressurized fluid from said primary to said secondary source.

5. The fluid control system as claimed in claim 4 including relief means disposed between said primary and secondary sources providing flow of said pressurized fluid from said secondary to said primary source above a predetermined pressure of said pressurized fluid from said secondary source.

6. In an engine powered vehicle, a fluid control system for braking comprising: a fluidly actuated brake; an engine driven fluid pump providing pressurized fluid for said brake; a fluid reservoir; a primary fluid control valve connected to said pump and said reservoir and operatively connected to said brake for selectively connecting said pump to said brake or said brake to said reservoir; a secondary source of pressurized fluid for said brake; a secondary fluid control valve connected to said secondary source and said fluid reservoir and operatively connected to said brake for selectively connecting said secondary source to said brake or said brake to said fluid reservoir; and valve means connected to and disposed between said primary and secondary fluid control valves and said brake responsive to a greater pressure of said pressurized fluid from said primary fluid control valve than from said secondary fluid control valve to block said brake from said secondary fluid control valve and connect said primary fluid control valve to said brake, and responsive to a greater pressure of said pressurized fluid from said secondary fluid control valve than from said primary fluid control valve to block said brake from said primary fluid control valve and connect said secondary fluid control valve to said brake.

7. The fluid control system as claimed in claim 6 wherein said valve means includes a valve body having a bore provided therein having a first ball valve seat at a first end connected to said primary fluid control valve and a second ball valve seat at a second end connected to said secondary fluid control valve and a port at a midpoint between said first and second ends connected to said brake, and said valve means includes a ball slidably disposed in said bore responsive to said higher pressure of said pressurized fluid from said primary fluid control valve than from said secondary fluid control valve to abut said second ball valve seat and block said secondary fluid control valve from said bore and responsive to said higher pressure of said pressurized fluid from said secondary fluid control valve than from said primary fluid control valve to abut said first ball valve seat and block said primary fluid control means from said bore.

8. The fluid control system as claimed in claim 6 including a fluid connection between said fluid pump and said secondary source of said pressurized fluid, and wherein said secondary source includes a gas charged, fluid accumulator connected to said connection.

9. The fluid control system as claimed in claim 8 including a check valve disposed in said connection between said pump and said accumulator allowing flow of pressurized fluid from said pump to said accumulator and blocking flow thereof from said accumulator to said pump.

10. The fluid control system as claimed in claim 9 including a pilot operated valve in parallel with said check valve to allow the flow of said pressurized fluid from said accumulator to said pump above a predetermined pressure level.

11. In a vehicle having left and right independently fluidly actuated wheel brakes disposed in a transmission case, a fluid control system comprising: a fluid pump for providing pressurized fluid; a fluid reservoir; left and right fluid control valves fluidly connected to said pump and said reservoir and having left and right brake ports respectively provided therein, said left fluid control valve actuable to selectively connect said pump to said left brake port or said left brake port to said reservoir and said right fluid control valve actuable to selectively connect said pump to said right brake port or said right brake port to said reservoir; a gas charged fluid accumulator; a secondary fluid control valve fluidly connected to said accumulator and said reservoir and having a secondary brake port provided therein, said secondary fluid control valve actuable to selectively connect said accumulator to said secondary brake port or said secondary brake port to said reservoir; left and right valve means disposed in said transmission housing commonly connected to said secondary brake port of said secondary fluid control valve and respectively connected to said left and right brake ports of said respective left and right control valves, said left and right valve means respectively connected to said left and right brakes, said left valve means responsive to a greater pressure of said pressurized fluid at said left brake port than at said secondary brake port to fluidly connect said pump to said left brake and to block said secondary fluid control valve therefrom and responsive to a greater pressure of said pressurized fluid at said secondary brake port than at said left brake port to fluidly connect said accumulator to said left brake and block said left fluid control valve therefrom, and said right valve means responsive to a greater pressure of said pressurized fluid at said right brake port than at said secondary brake port to fluidly connect said pump to said right brake and to block said secondary fluid control valve therefrom and responsive to a greater pressure of pressurized fluid at said secondary brake port than at said right brake port to fluidly connect said accumulator to said right brake and block said right fluid control valve therefrom.

12. The fluid control system as claimed in claim 11 wherein said left valve means includes a bore disposed in said transmission case having a first ball valve seat at a first end connected to said left control valve and a second ball valve seat at a second end connected to said secondary control valve and at a midpoint between said first and second ends to said left brake, and said right valve means includes a second bore provided in a first transmission case having said ball valve seat at a first end connected to said right control valve and a second ball valve seat at a second end connected to said secondary control valve and to the second end of said first bore and at a midpoint between said first and second ends to said right brake, first and second balls respectively disposed in said first and second bores slidable between said respective first and second ball valve seats to block said bores while allowing fluid flow between said opposite ball seats and said midpoints.

13. The fluid control system as claimed in claim 11 wherein said accumulator is fluidly connected to said main pump and including a check valve disposed in said connection between said accumulator and said main pump to allow the flow of pressurized fluid from said pump to said accumulator and block reverse flow therethrough.

14. The fluid control system as claimed in claim 13 including a relief valve disposed in parallel with said check valve allowing flow from said accumulator to said main pump above a predetermined pressure of said pressurized fluid in said accumulator.

* * * * *

UNITED STATES PATENT AND TRADEMARK OFFICE
CERTIFICATE OF CORRECTION

PATENT NO. : 4,190,298

DATED : 26 February 1980

INVENTOR(S) : Lawrence Russell Klope

It is certified that error appears in the above—identified patent and that said Letters Patent is hereby corrected as shown below:

Column 4, line 59, delete "pressurizing" and insert
-- pressurized --.

Column 6, line 55, delete "a first" and insert
-- said --.

Column 6, line 56, delete "said" and insert -- a first --.

Signed and Sealed this

Eighth Day of June 1982

[SEAL]

Attest:

GERALD J. MOSSINGHOFF

*Attesting Officer*  *Commissioner of Patents and Trademarks*